(12) United States Patent
Chen

(10) Patent No.: US 7,775,604 B2
(45) Date of Patent: Aug. 17, 2010

(54) INTERLOCKING METHOD AND ITS STRUCTURE FOR WHEEL-RIM COVER

(76) Inventor: Chen-Chun Chen, No. 2, Alley 66, Lane 252, Singnan St., Tainan City (TW)

( * ) Notice: Subject to any disclaimer, the term of this patent is extended or adjusted under 35 U.S.C. 154(b) by 94 days.

(21) Appl. No.: 12/153,019

(22) Filed: May 13, 2008

(65) Prior Publication Data

US 2009/0284070 A1 Nov. 19, 2009

(51) Int. Cl.
*B60B 7/10* (2006.01)
(52) U.S. Cl. .............. 301/37.34; 301/37.102; 301/37.36
(58) Field of Classification Search ........... 301/37.101, 301/37.102, 37.31, 37.32, 37.33, 37.34, 37.36
See application file for complete search history.

(56) References Cited

U.S. PATENT DOCUMENTS

| | | | | |
|---|---|---|---|---|
| 2,644,721 A * | 7/1953 | Grimshaw | ............... | 301/37.34 |
| 2,749,184 A * | 6/1956 | Wood | ..................... | 301/37.34 |
| 2,749,185 A * | 6/1956 | Wood | ..................... | 301/37.29 |
| 4,889,394 A * | 12/1989 | Ruspa | ..................... | 301/37.36 |
| 5,108,157 A * | 4/1992 | Chen | ..................... | 301/37.42 |
| 5,718,484 A * | 2/1998 | Sheu | ..................... | 301/37.33 |
| 5,752,745 A * | 5/1998 | Sheu | ..................... | 301/37.32 |
| 5,791,741 A * | 8/1998 | Sheu | ..................... | 301/37.34 |
| 6,450,582 B2 * | 9/2002 | Ichikawa et al. | .......... | 301/37.36 |
| 6,682,150 B1 * | 1/2004 | Chen | ..................... | 301/37.33 |
| 6,789,854 B2 * | 9/2004 | Wang | ..................... | 301/37.33 |
| 6,932,434 B2 * | 8/2005 | Wang | ..................... | 301/37.102 |
| 7,213,889 B2 * | 5/2007 | Wang | ..................... | 301/37.33 |
| 7,488,045 B1 * | 2/2009 | Wang | ..................... | 301/37.33 |
| 2004/0195906 A1 * | 10/2004 | Huang Tsai | ............. | 301/37.33 |

FOREIGN PATENT DOCUMENTS

EP 123260 A2 * 10/1984
JP 63134303 A * 6/1988

* cited by examiner

*Primary Examiner*—Russell D Stormer
(74) *Attorney, Agent, or Firm*—Rosenberg, Klein & Lee

(57) ABSTRACT

An interlocking method and its structure for wheel-rim cover is provided and includes a plurality of engaging seats integrally formed along the peripheral edge of the rear side of a wheel-rim cover body. Each engaging seat has an interlocking block pivotally coupled thereto. An inner edge of the interlocking block forms the pivotal axis thereof and is displaceably disposed on an inclined surface of an engaging slot formed in the engaging seat. The outer edge of the interlocking block is displaceably disposed in an engaging groove of the wheel-rim body. By that arrangement, displacement of the wheel-rim cover body toward the hub of the wheel-rim body results in a displacement of the interlocking block to provide respective frictional engagement of the inner and outer ends of the interlocking block with the inclined surface of the engaging slot and the surface of the engaging groove.

8 Claims, 12 Drawing Sheets

INTERLOCKING METHOD AND ITS STRUCTURE FOR WHEEL-RIM COVER

BACKGROUND OF THE INVENTION

1. Field of the Invention

The present invention relates to an interlocking method and its structure for a wheel-rim cover, particularly to an interlocking method and its structure for a wheel-rim cover in which interlocking blocks are used to insert and combine the wheel-rim cover body on the front side of the wheel-rim body, without affecting the stacking height of the wheel-rim cover bodies, such that the stocking space can be reduced.

2. Brief Description of the Prior Art

Wheel-rims are closely linked with the performance and manipulation capacity of the car, though not to be regarded as the main structure of the car body. Aside from the closely linked relationship between the size and the aspect ratio of the tire, the weight of the wheel-rim also affects acceleration capacity of car. Moreover, the wheel-rim plays an important role in the appearance and the whole design of a car. Accompanying with the progress in material science, the material used in the wheel-rim has changed from iron, used in the past, to aluminum alloy, Al—Mg alloy etc. used today.

The abovementioned wheel-rim is interlocked with a wheel-rim cover. As shown in FIG. 12, the wheel-rim cover (5) is provided with a fixing seat (51) along the annular edge. A plurality of interlocking bodies (52) spaced at a suitable interval are provided on the fixing seat (51). A steel ring (53) is provided to surround the interlocking bodies (52), so that the interlocking bodies (52) can be inserted and engaged with the ring edge of the car wheel-rim, with support of the steel ring (53).

However, the above interlocking structure for a wheel-rim cover has the following defects in practical application.

3. The above interlocking structure for a wheel-rim cover uses a steel ring to support the interlocking body of the wheel-rim cover so that the interlocking body of the wheel-rim cover can be inserted and engaged with the ring edge of the car wheel-rim. However, the steel ring contributes to the high cost.

4. The above interlocking structure for a wheel-rim cover uses the interlocking body to insert and engage the wheel-rim cover with the wheel-rim of a car. However, the interlocking body can not be folded so that wheel-rim cover takes a lot of space in packaging. Accordingly, not only the added delivery cost is increased but also business competitiveness of the manufacturer becomes weaker.

SUMMARY OF THE INVENTION

In view of the above defects, the present invention provides an interlocking method and its structure for a wheel-rim cover in which interlocking blocks are used to insert and combine the wheel-rim cover body on the front side of the wheel-rim body so as to ensure that the wheel-rim cover body will not detach from the wheel-rim body. In addition, the engaging seats do not affect the stacking height of the wheel-rim cover bodies, such that the stocking space can be reduced.

The preferred embodiment of the interlocking method and its structure for a wheel-rim cover of the present invention is characterized in that the interlocking method and its structure for a wheel-rim cover mainly has a wheel-rim body and a wheel-rim cover body. A plurality of engaging seats are each integrally formed along the peripheral edge at the rear side of the wheel-rim cover body. Each engaging seat is pivotally contacted with an interlocking block. When the interlocking blocks are rotated with the pivotal contact portions, as the axis and the other ends of the interlocking blocks pass through a horizontal radial line extending from the axis, both ends of each interlocking block will abut tightly against the wheel-rim body and the wheel-rim cover body respectively so as not to be unable to rotate in view of the length between both ends of each interlocking block being made to be larger than the vertical distance from the engaging groove of the wheel-rim body to the inside edge of the pivotal contact end of the interlocking block of the wheel-rim cover body.

According to the first embodiment of the interlocking method and its structure for a wheel-rim cover of the present invention, the engaging seats are formed with engaging slots, and both sides of each interlocking block are formed respectively with pivotal contact portions. The pivotal contact portions are provided with protrusions to engage tightly with ridge portions provided on both sides of the engaging seats.

According to the other embodiment of the interlocking method and its structure for a wheel-rim cover of the present invention, the engaging seats are provided with a common pivotal shaft, and the interlocking blocks are formed with pivotal claws which are pivotally contacted with said pivotal shaft.

BRIEF DESCRIPTION OF THE DRAWINGS

The present invention will be better understood by the detailed description of the following preferred embodiments with reference to the accompanying drawings, in which.

DETAILED DESCRIPTION OF THE PREFERRED EMBODIMENTS

The technical contents of the present invention will become more apparent from the detailed description of the preferred embodiments in conjunction with the accompanying drawings.

Figure 1:
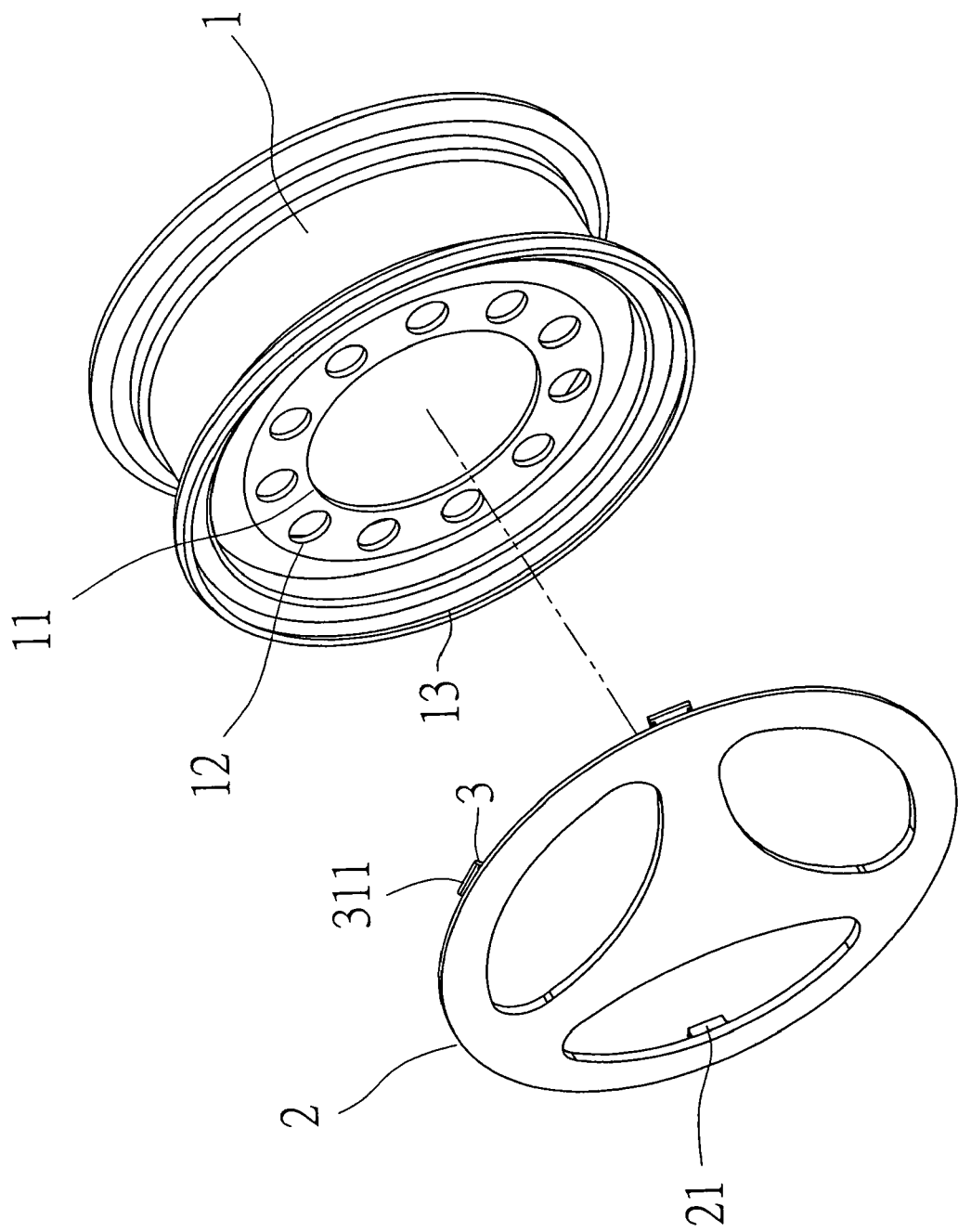
FIG. 1 is a perspective exploded view showing the first embodiment of the present invention.

Firstly referring to FIG. 1 showing a schematic view of the first embodiment of the interlocking method and its structure for a wheel-rim cover of the present invention, a wheel-rim body (1), a wheel-rim cover body (2) and a plurality of interlocking blocks (3) are included therein.

The wheel-rim body (1) is made of a metal material by casting or forging. The inner peripheral walls on the front and rear sides of the wheel-rim body (1) are respectively coupled with a hub (11) in which a plurality of holes (12) are arranged in ring shape. Both the front and rear outer edges of the wheel-rim body (1) are bent inward respectively to form an engaging groove (13) for engagement with the interlocking blocks (3), so that the wheel-rim cover body (2) can be fixed on the front side of the wheel-rim body (1).

Figure 2:
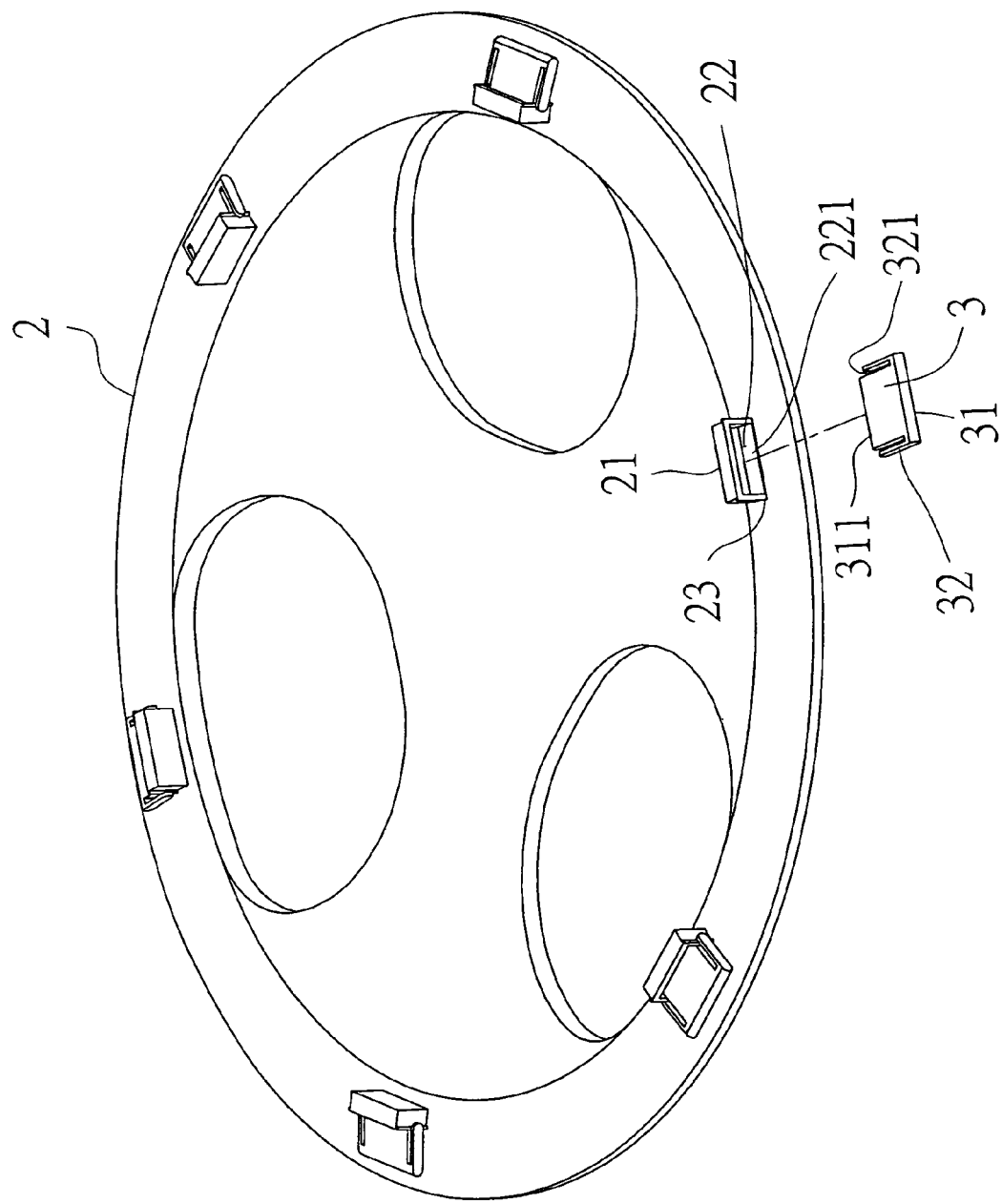
FIG. 2 is a perspective view showing the wheel-rim cover body and the interlocking block of the first embodiment of the present invention.
Figure 3:
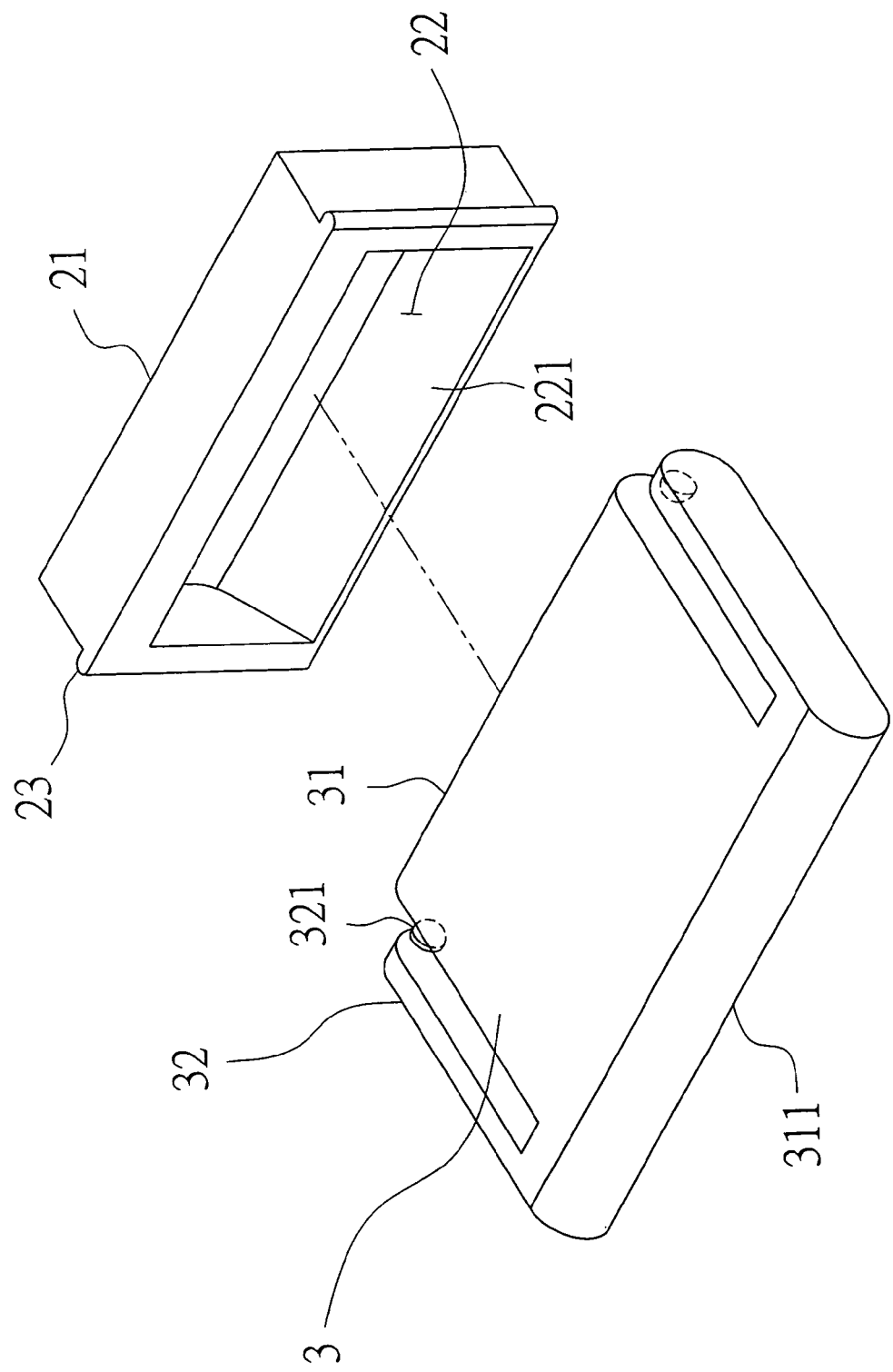
FIG. 3 is a perspective exploded view showing the wheel-rim cover body and the interlocking block of the first embodiment of the present invention.
Figure 4:
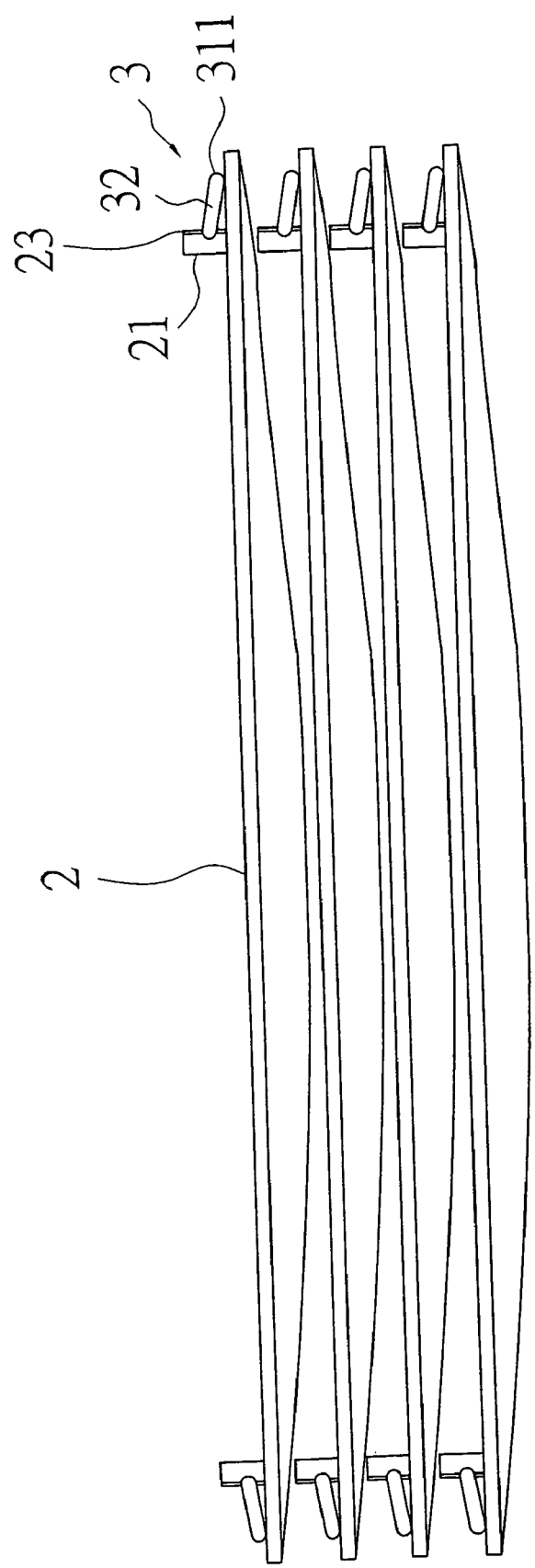
FIG. 4 is a front view showing the stacked state of a plurality of wheel-rim cover bodies of the first embodiment of the present invention.
Figure 5:
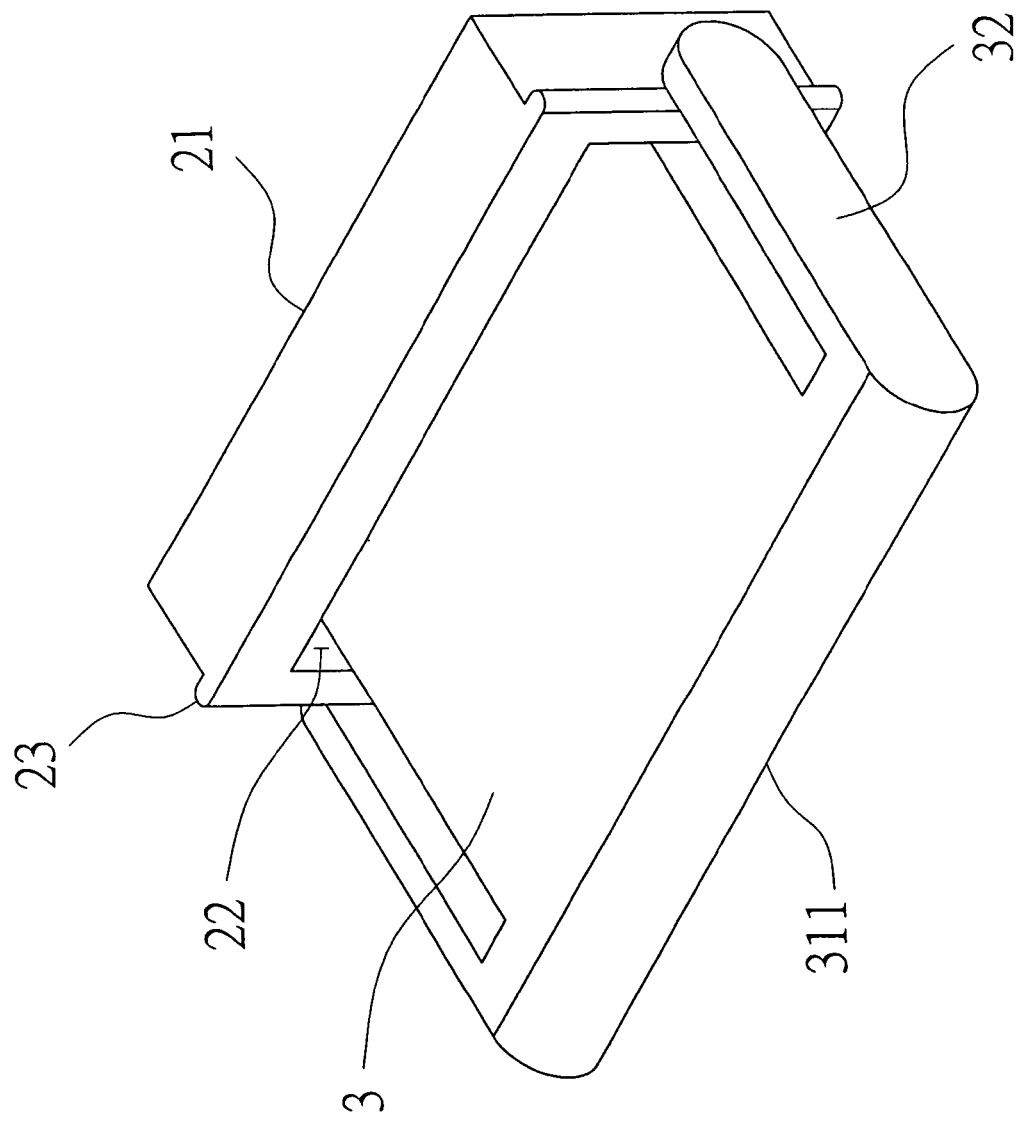
FIG. 5 is an assembly view showing the wheel-rim cover body and the interlocking block of the first embodiment of the present invention.
Figure 6:
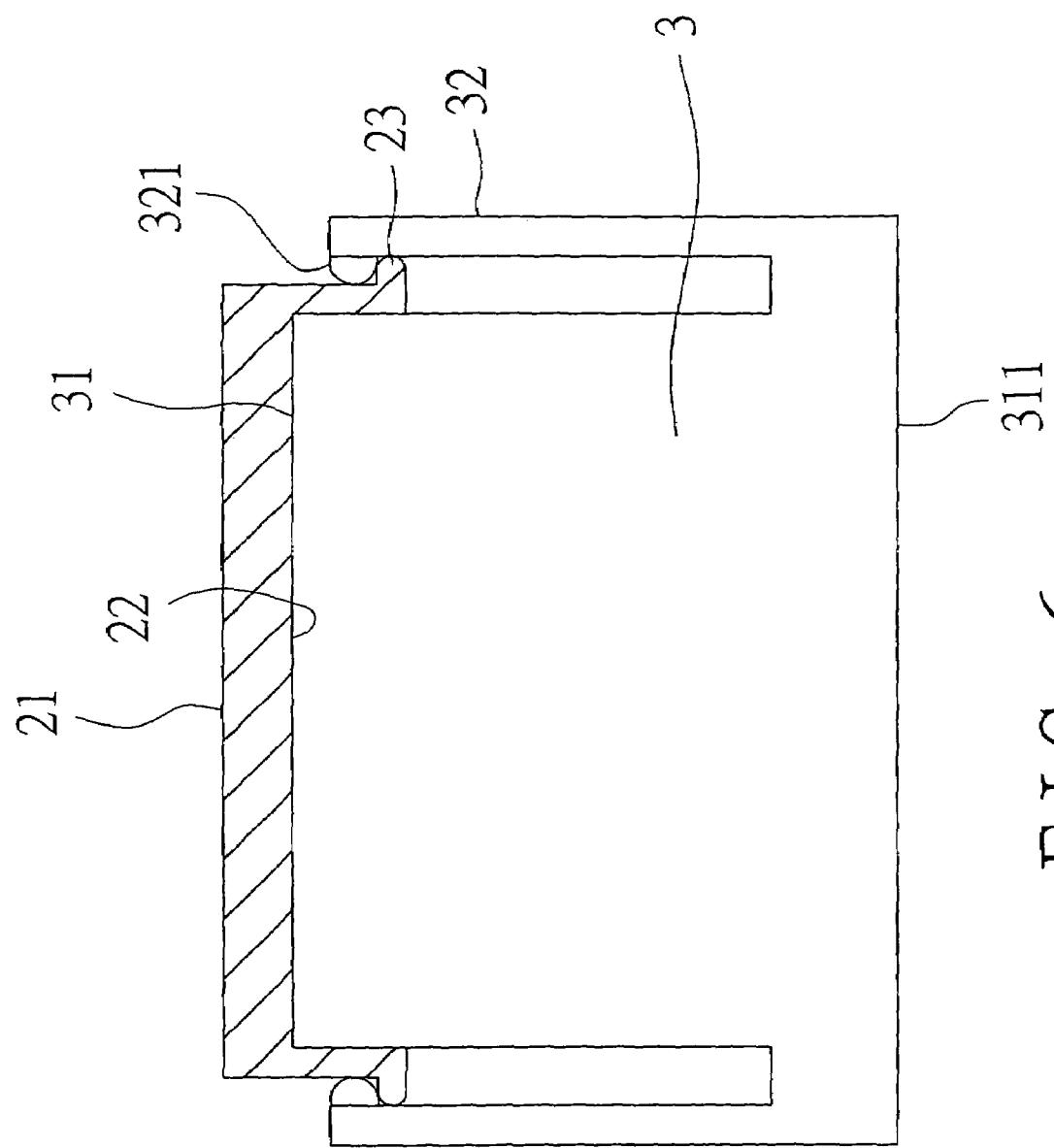
FIG. 6 is a assembled sectional view showing the wheel-rim cover body and the interlocking block of the first embodiment of the present invention.
Figure 7:
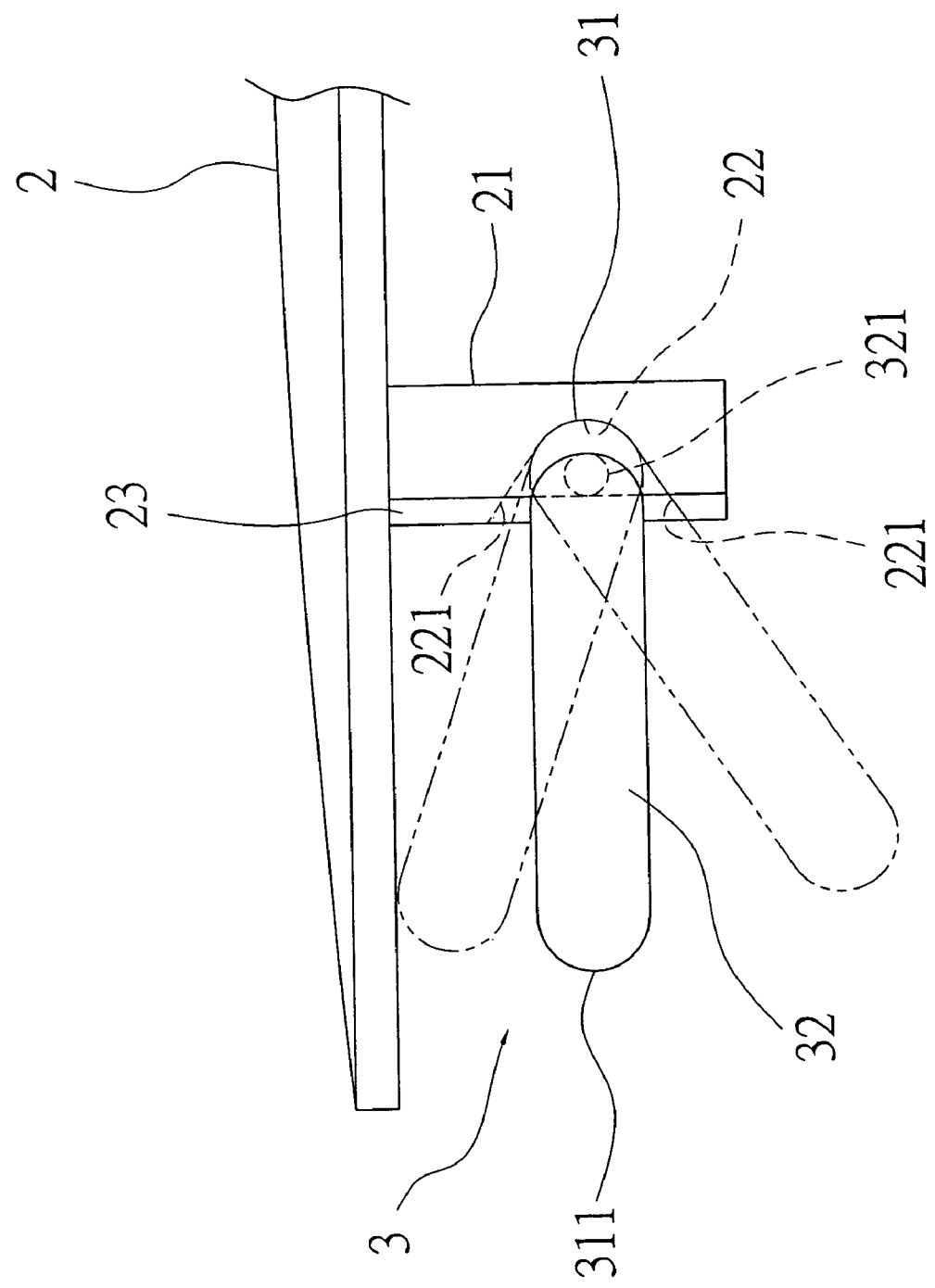
FIG. 7 is a view showing the rotation state of the interlocking block of the first embodiment of the present invention.

The wheel-rim cover body (2) is formed as a convex type disk, as shown in FIGS. 2 to 4, on which a plurality of engaging seats (21) are integrally formed on the rear side along the peripheral edge thereof. Each engaging seat (21) is formed as a rectangular box shape with its height substantially equal to the thickness of the wheel-rim cover body (2), from the center point of the wheel-rim cover body (2) to peripheral edge, such that the stacking height of the wheel-rim cover bodies (2) can be reduced so as to save stocking space in the factory. Each engaging seat (21) is formed with an engaging slot (22) of rectangular shape opening toward the peripheral edge of the wheel-rim cover body (2). The inner wall top end face and the bottom end face of the engaging slot (22) are tapered inwardly to respectively form inclined surfaces (221). Both sides of each engaging seat (21) are respectively formed with a ridge portion (23) with respect to the engaging slot (22) for holding the pivotal contact portion (32) of the interlocking block (3).

The interlocking block (3) is a flat plate body of rectangular shape, as shown in FIGS. 2 and 3, the cross sectional area of which is smaller than that of the engaging slot (22) of the wheel-rim cover body (2) such that the engaging slot (22) has space for the interlocking block (3) to rotate freely therein. The front end and the rear end of the interlocking block (3) are formed as inside edge (31) and outside edge (311) having a circular arc shape. The outside edge (311) has two limbs extended on both sides to form pivotal contact portions (32) which are each an elongate flat plate body parallel to both lateral surfaces of the interlocking blocks (3). A semi-spherical protrusion (321) is provided on each end of the pivot portions (32) with respect to the inside edge (31) for holding the ridge portion (23) of the engaging seat (21).

In the assembling process, as shown in FIGS. 1, 5 to 7, the inside edge (31) of each interlocking blocks (3) is inserted into the engaging slot (22) on the periphery of the wheel-rim cover body (2) and abuts against the inside wall of each engaging slot (22), and the semi-spherical protrusion (321) on the inner side of each pivotal contact portion (32) is engaged and held by the corresponding ridge portion (23). Since the cross sectional areas of the interlocking blocks (3) are smaller than that of the engaging slots (22) of the wheel-rim cover body (2), the interlocking blocks (3) can rotate freely in the engaging slot (22) with the inside edge (31) as the pivotal axis, and the upper and the lower sides of the interlocking blocks (3) being in close contact with the inclined surfaces (221) in the interior of the engaging slots (22). As shown in FIG. 4, a plurality of wheel-rim cover bodies (2) can be stacked as a layered structure in such a manner that the interlocking blocks (3) are rotated to allow the outside edge (311) in close contact with the wheel-rim cover body (2). Since the height of each engaging seat (21) is substantially equal to the thickness of the wheel-rim cover body (2) from the center point of the wheel-rim cover body (2) to the peripheral edge, the stacking height of the wheel-rim cover bodies (2) is reduced so as to save stocking space in the factory. Accordingly, the delivery cost including export delivery expense and multi-stage inland delivery expense can be remarkably reduced.

Figure 8:
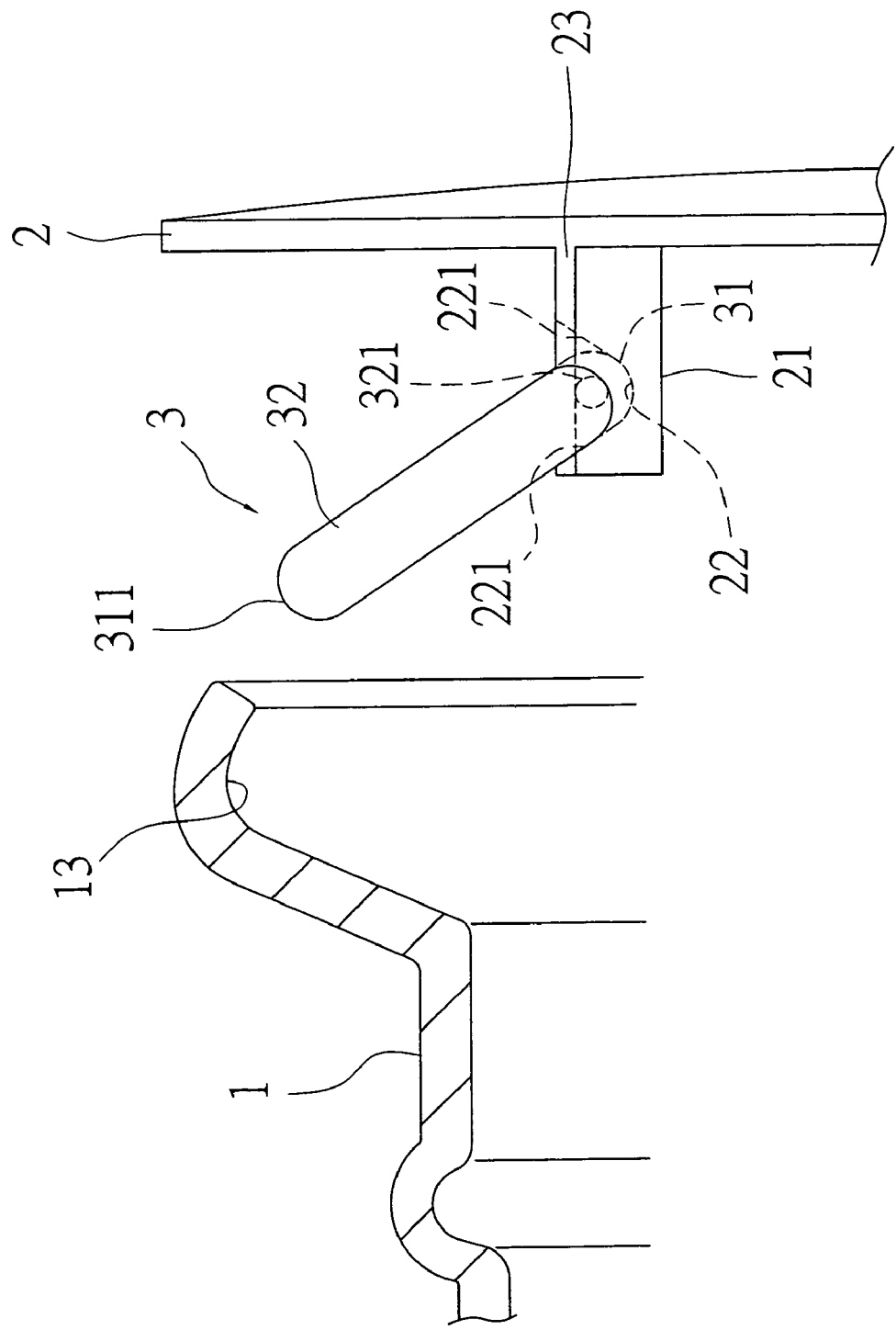
FIG. 8 is a view showing the state of the interlocking block of the first embodiment of the present invention before insertion into the engaging groove.
Figure 9:
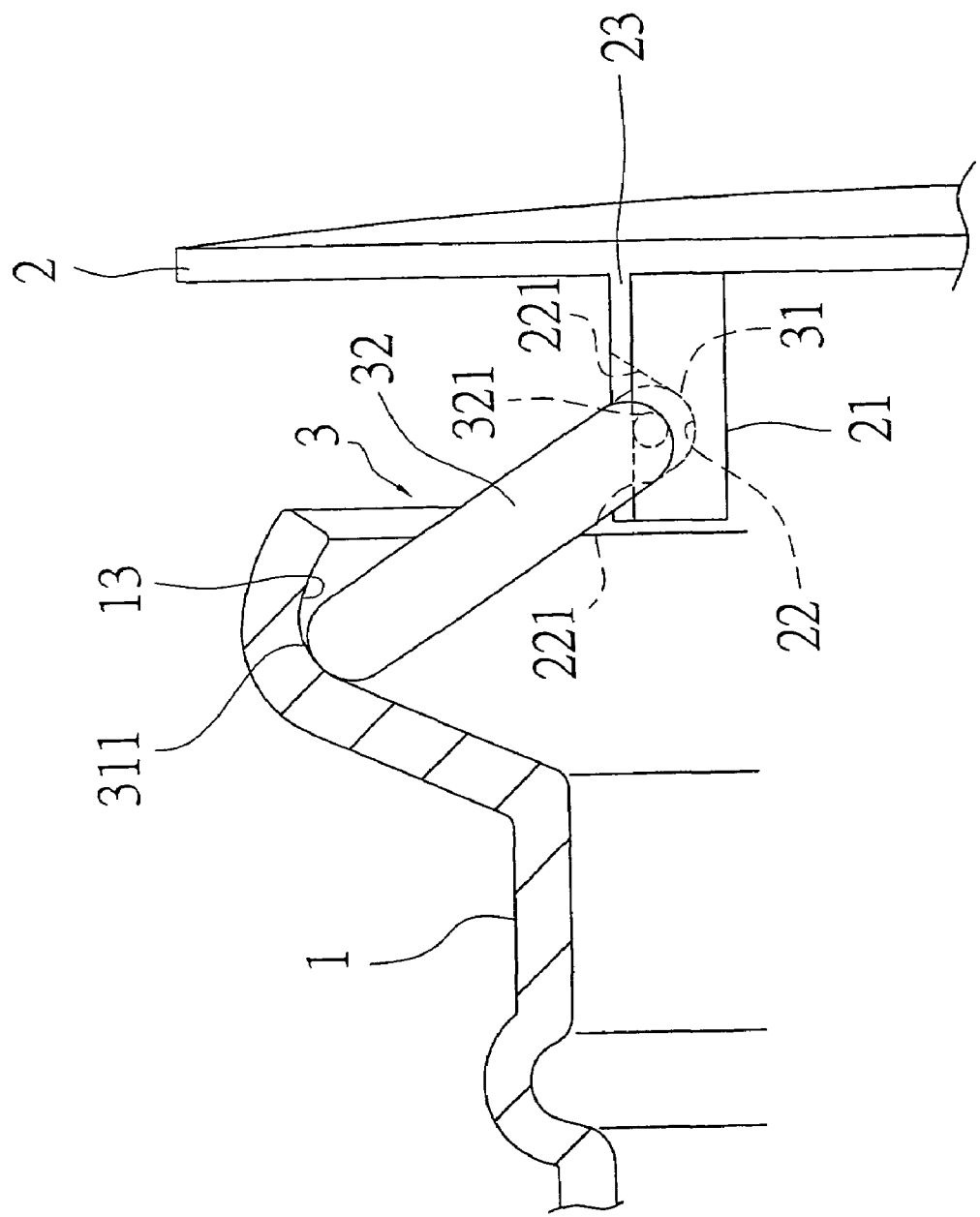
FIG. 9 is a view showing the state that the interlocking block of the first embodiment of the present invention while being inserted into the engaging groove.
Figure 10:
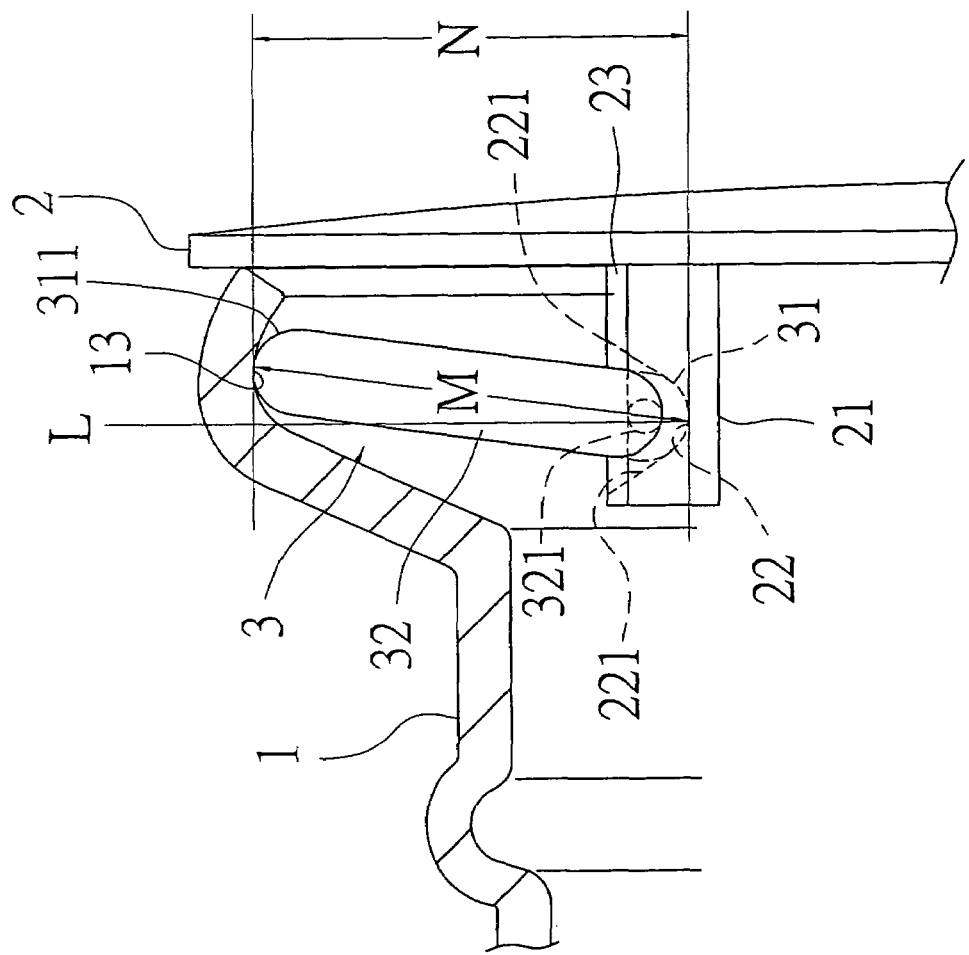
FIG. 10 is a view showing the state of the interlocking block of the first embodiment of the present invention after insertion into the engaging groove.

In practical application, as shown in FIGS. 8 to 10, the interlocking blocks (3) can be rotated respectively within the engaging slots (22) of the wheel-rim cover body (2) with the respective inside edges (31) as the pivotal axis, and the lower side face of each interlocking block (3) being in close contact with the inclined surface (221) within the engaging slot (22), so that the outside edge (311) of each interlocking block (3) is spaced away from the wheel-rim cover body (2). Then, when the wheel-rim cover body (2), with all the interlocking blocks (3) mounted on the front side of the wheel-rim body (1), the outside edge (311) of the interlocking block (3) is abutted against the inside of the engaging groove (13) of the wheel-rim body (1). Next, the wheel-rim cover body (2) is pushed toward the wheel-rim body (1) to be in close contact with the front side of the wheel-rim body (1). Along with that action of displacing the wheel-rim cover body (2), the engaging seat (21) will move the interlocking block (3) to rotate such that the outside edge (311) of the interlocking block (3) passes through a horizontal radial line (L) projected from the pivotal axis thereof, tilts toward the wheel-rim cover body (2) and is finally fixed within the groove (13), at the outer side thereof. Since the length (M) between the front end and the rear end of the interlocking block (3) is larger than the vertical distance from the engaging groove (13) of the wheel-rim body (1) to the inside edge (31) of the pivot end of the interlocking block (3), the interlocking block (3) is difficult to rotate due to that dimensional difference. Thus, a very big force is required to pull the wheel-rim cover body (2) from the wheel-rim body (1), as the engaging groove (13) of the wheel-rim body (1) is engaged by the interlocking block (3), and the frictional force between the outside edge (311) of the interlocking block (3) and the engaging groove (13) must be overcome to cause the outside edge (311) of the interlocking block (3) to move toward the inside of the engaging groove (13). In this way, the interlocking block (3) can rotate responsive to displacement of the outside edge (311) within the engaging groove (13), and then the wheel-rim cover body (2) can be stably fixed on the front side of the wheel-rim body (1). Therefore, the wheel-rim cover body (2) can withstand the wind pressure that occurs during the driving of a car, to ensure that detachment of the wheel-rim cover body (2) from the wheel-rim body (1) is avoided.

Figure 11:
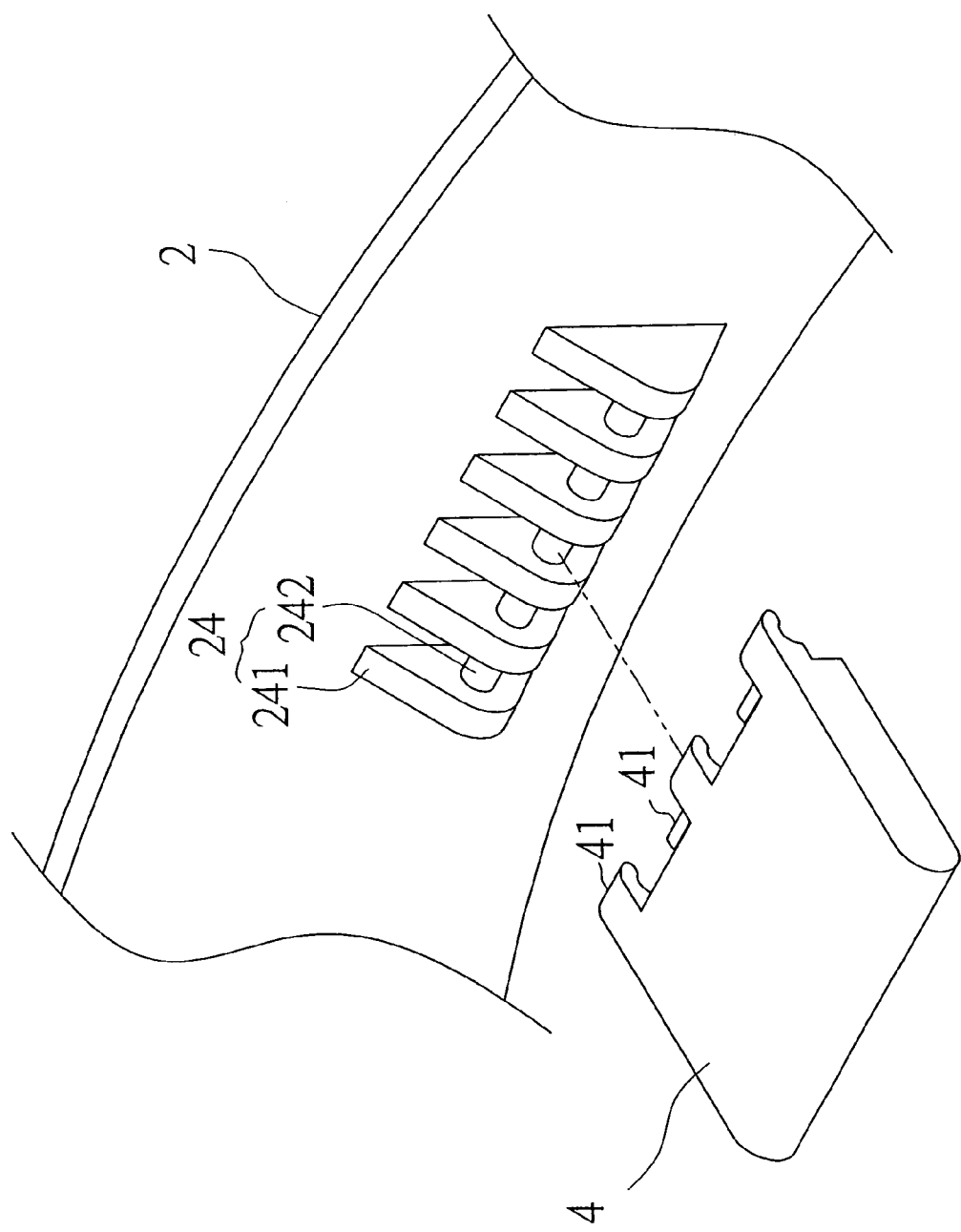
FIG. 11 is a schematic view showing the second embodiment of the present invention.
Figure 12:
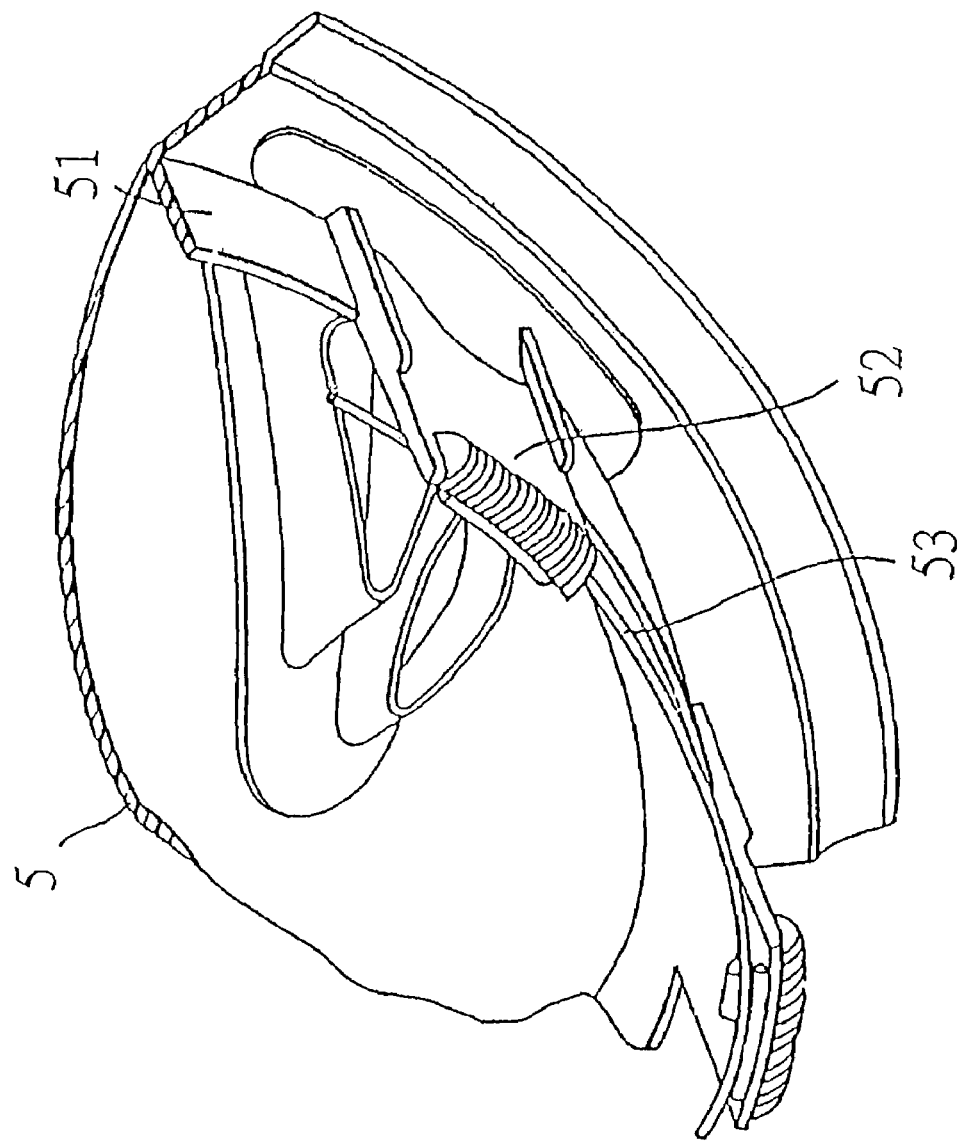
FIG. 12 is a perspective exploded view of a prior art structure.

Referring to FIG. 11, a schematic view of the second embodiment of the interlocking method and its structure for a wheel-rim cover of the present invention is shown. The difference between the second embodiment and the first embodiment is that the engaging seats (24) in the second embodiment have a plurality of support plates (241) projecting at the front side. A pivotal shaft (242) is provided through all of the support plates (241), and a plurality of pivotal claws (41) are alternately provided on the upper and lower sides of each interlocking block (4), at the rear end thereof. The pivotal claws (41) of the interlocking block (4) are pivotally mounted on the pivotal shaft (242) in order that the interlocking block (4) can be rotated with the pivotal shaft (242) of the engaging seat (24) as the axis. In this manner, the interlocking operation can be conducted. The above embodiments or the figures are not restrictive to the aspect of the present invention, pivotal contact structure or the quantities of corresponding engaging seats and interlocking blocks. Modifications and variations may be proposed by those persons skilled in the art without departing from the spirit of the present invention and are considered to still be within the scope of the present invention.

As is apparent from the description of the above elements, composition and embodiments, this invention surely has the following advantages when compared with prior art.

3. After the completion of assembly, each interlocking block of the present invention can be rotated to allow its two ends to respectively abut against the surface of the engaging groove of the wheel-rim body and the inclined surface of the engaging seat of the wheel-rim cover body, such that the wheel-rim cover body is stably inserted and fixed on the front side of the wheel-rim body. By that arrangement, the wheel-rim cover body can withstand the wind pressure that occurs during the driving of a car to ensure that detachment of the wheel-rim cover body from the wheel-rim body is avoided.

4. During the stacking of a plurality of the wheel-rim cover bodies of the present invention, the stacking height of the wheel-rim cover body is reduced, to save stocking space in the factory. Accordingly, the delivery cost including export delivery expense and multi-stage inland delivery expense can be remarkably reduced.

What is claimed is:

1. A method for interlocking a wheel-rim cover to a wheel-rim body, comprising the steps of:

providing a wheel-rim cover body;

providing a plurality of engaging seats disposed along a peripheral edge of said wheel-rim cover body, each of said engaging seats including an engaging slot formed therein with at least one inner wall thereof having an inwardly inclined surface, each of said engaging seats further having a pair of ridge portions respectively extending from opposing sides thereof;

providing a plurality of interlocking blocks respectively pivotally coupled to said plurality of engaging seats, each of said interlocking blocks having inside and outside edges and a pair of pivotal contact portions disposed on opposing sides thereof respectively engaged with said pair of ridge portions of a corresponding one of said engaging seats for displaceably securing said interlocking block to said corresponding engaging seat, said inside edge being disposed within said engaging slot and defining a displaceable pivotal axis of said interlocking block;

disposing said wheel-rim cover body on the wheel-rim body to thereby abut said outside edges of said plurality of interlocking blocks against a surface of an engaging groove of the wheel-rim body; and displacing said wheel-rim cover body toward a hub of the wheel-rim body to displace said outside edges of said plurality of interlocking blocks along the surface of the engaging groove toward an outer edge thereof and thereby displace said inside edge of each said interlocking block along said inwardly inclined surface of a corresponding engaging slot to frictionally engage said interlocking block between said inclined surface of said engaging slot and the surface of the engaging groove of the wheel-rim body.

2. The method as claimed in claim 1, wherein the step of providing a plurality of engaging seats includes the step of providing opposing upper and lower inner walls of each said engaging slot as inwardly inclined surfaces.

3. The method of claim 1, wherein the step of providing a plurality of interlocking blocks includes the step of providing a plurality of interlocking blocks where both said inside and outside edges have a circular arcuate cross-sectional shape for respective sliding contact with said inclined surface of said inner wall of said engaging slot and the surface of the engaging groove.

4. The method of claim 1, wherein the step of providing a plurality of interlocking blocks includes the step of providing said plurality of interlocking blocks with each pivotal contact portion having a semi-spherically shaped protrusion engaged with a corresponding one of said ridge portions for displaceably retaining said interlocking block to said corresponding engaging seat.

5. An interlocking structure of a wheel-rim cover for engaging said wheel-rim cover with a wheel-rim body, comprising:

a wheel-rim cover body, a plurality of engaging seats disposed along a peripheral edge of said wheel-rim cover body, each of said engaging seats including an engaging slot formed therein with at least one inner wall thereof having an inwardly inclined surface, each of said engaging seats further having a pair of ridge portions respectively extending from opposing sides thereof; and a plurality of interlocking blocks respectively pivotally coupled to said plurality of engaging seats, each of said interlocking blocks having inside and outside edges and a pair of pivotal contact portions disposed on opposing sides thereof respectively engaged with said pair of ridge portions of a corresponding one of said engaging seats for displaceably securing said interlocking block to said corresponding engaging seat, said inside edge being disposed within said engaging slot and defining a displaceable pivotal axis of said interlocking block, said outside edge of each said interlocking block abutting against a surface of an engaging groove of the wheel-rim body responsive to said wheel-rim cover body being disposed thereon, wherein displacement of said wheel-rim cover body toward a hub of the wheel-rim body displaces said outside edge of each said interlocking block along the surface of the engagement groove toward an outer edge thereof and thereby displace said inside edge of each said interlocking block along said inwardly inclined surface of a corresponding engaging slot to frictionally engage said interlocking block between said inclined surface of said engaging slot and the engaging groove of the wheel-rim body.

6. The interlocking structure for wheel-rim cover as claimed in claim 5, wherein opposing upper and lower inner walls of each said engaging slot are inwardly inclined surfaces.

7. The interlocking structure for wheel-rim cover as claimed in claim 5, wherein each of said inside and outside edges have a circular arcuate cross-sectional shape for respective sliding contact with said inclined surface of said inner wall of said engaging slot and the surface of the engaging groove.

8. The interlocking structure for wheel-rim cover as claimed in claim 5, wherein each of said pivotal contact portions of said each said interlocking block has a semi-spherically shaped protrusion formed thereon, said semi-spherically shaped protrusion being engaged with a corresponding one of said ridge portions for displaceably retaining said interlocking block to said corresponding engaging seat.

* * * * *